Dec. 1, 1942.  E. DONLON  2,303,441
WINDCHARGER
Filed Oct. 10, 1941   2 Sheets-Sheet 1

Inventor
Edward Donlon,
By McMorrow & Berman
Attorneys

Dec. 1, 1942. E. DONLON 2,303,441
WINDCHARGER
Filed Oct. 10, 1941 2 Sheets-Sheet 2

Inventor
Edward Donlon,
By McMorrow & Berman
Attorneys

Patented Dec. 1, 1942

2,303,441

UNITED STATES PATENT OFFICE 2,303,441

WINDCHARGER

Edward Donlon, Providence, R. I.

Application October 10, 1941, Serial No. 414,515

2 Claims. (Cl. 170—76)

This invention relates to a windcharger and more particularly to a windmill construction especially adapted for furnishing the motive power of an electric system utilized for various purposes, and has for the primary object the provision of a device of the above stated character which will drive a conventional type of electric generator with a substantially uniform charging rate and operable by a wind of low velocity, the construction thereof being such that the generator may be made to operate at various speeds through the employment of different size pulley wheels and that the various moving parts of the drive mechanism will have friction reduced to a minimum.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation partly in section illustrating a windcharger constructed in accordance with my invention.

Figure 1:
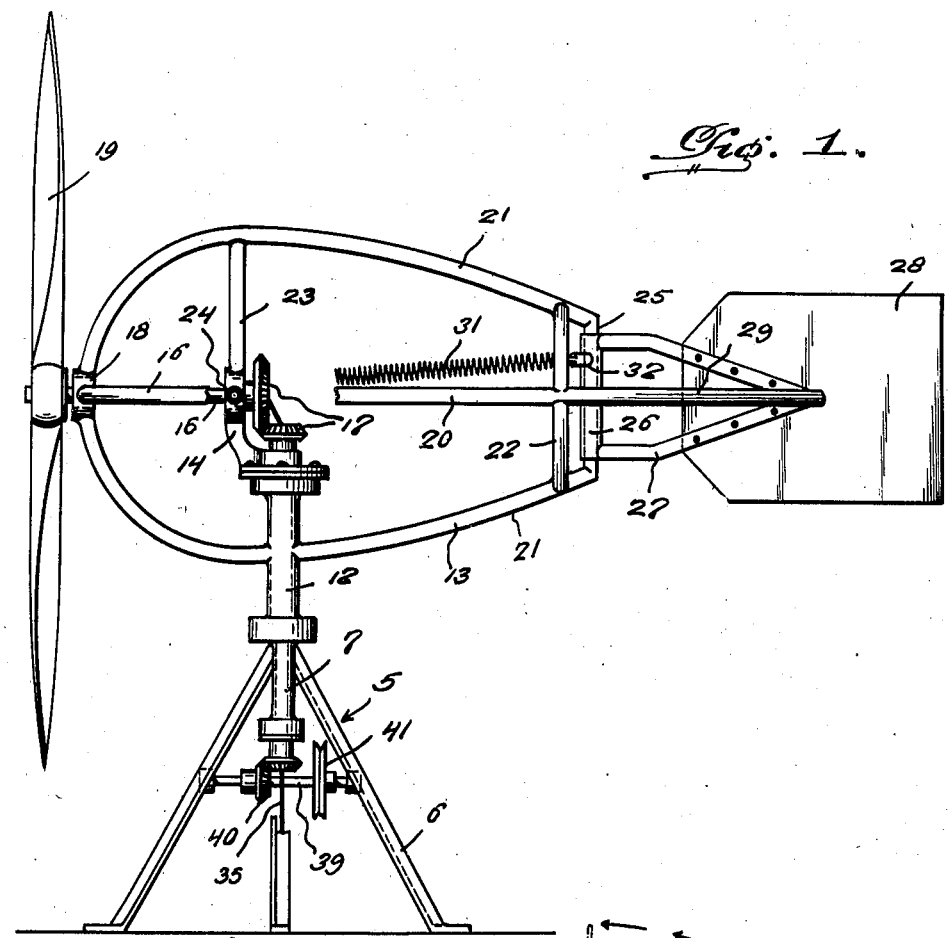

Referring in detail to the drawings, the numeral 5 indicates a tower construction, primarily employing converging legs 6 having their upper converging ends suitably secured to a vertically arranged supporting sleeve 7 in which is journaled a hollow power shaft 8, suitable anti-friction bearings 9 and 10 being provided between the sleeve 7 and the power shaft to permit the latter to rotate with a minimum amount of friction.

Anti-friction bearings 11 are mounted on the exterior of the sleeve 7 to rotatably support a bearing sleeve 12 forming an integral part of a head construction 13. A suitable hanger 14 is mounted on the upper end of the bearing sleeve and is apertured to permit the shaft 8 and the sleeve or housing 7 to extend therethrough. The hanger 14 carries an anti-friction bearing 15 supporting a power shaft 16 adjacent one end thereof and which is connected to the power shaft 8 by gears 17. The shaft 16 is further supported by a bearing 18 mounted in the head construction and has secured thereto a wind wheel 19 constructed similarly to a propeller used upon an aeroplane or like aircraft.

The head construction 13 is free to rotate about the housing 7, the latter acting as a vertical axis. The head construction 13 is of skeleton formation employing a pair of main frame members 20 and 21 each of substantially tear-drop formation and arranged at right angles to each other and connected to each other at the bearing 18. The frame members 20 and 21 are further connected to each other by arcuately curved members 22 grouped in annular formation. The frame members 20 and 21 are connected to the hanger 14 by vertical and horizontal brace members 23 and 24. The head construction 13 thus formed will be extremely rigid and will only offer a minimum amount of wind resistance.

The ends of the frame member 21 are connected by a vertically arranged post 25 on which is journaled a sleeve 26 carrying integrally therewith vane arms 27. The vane arms 27 support a tail vane 28 free to hinge on the head construction. One end of the frame member 20 extends beyond the other end to form a stop arm 29 for limiting the hinging movement of the tail vane in one direction. When the tail vane 28 is in engagement with the stop arm 29 it is in position of maintaining the wind wheel in the wind and is urged into engagement with the stop arm 29 by a coil spring 31 connected to an arm 32 formed on the sleeve 26 and connected to one of the arms 24 of the head construction.

A rigid arm 32' extends horizontally from the frame member 20 and is in alignment with the brace arms 24 and carries a pilot vane 33. The pilot vane 33 is smaller than the tail vane 28 and occupies a plane parallel to the path of rotation of the wind wheel. When the pressure of the wind against the pilot vane is greater than the power of the spring 31 but less than the pressure of the wind against the tail vane 28, the head construction is rotated with respect to the tail vane with the result that the propeller or wind wheel is carried out of the wind.

Figure 2:
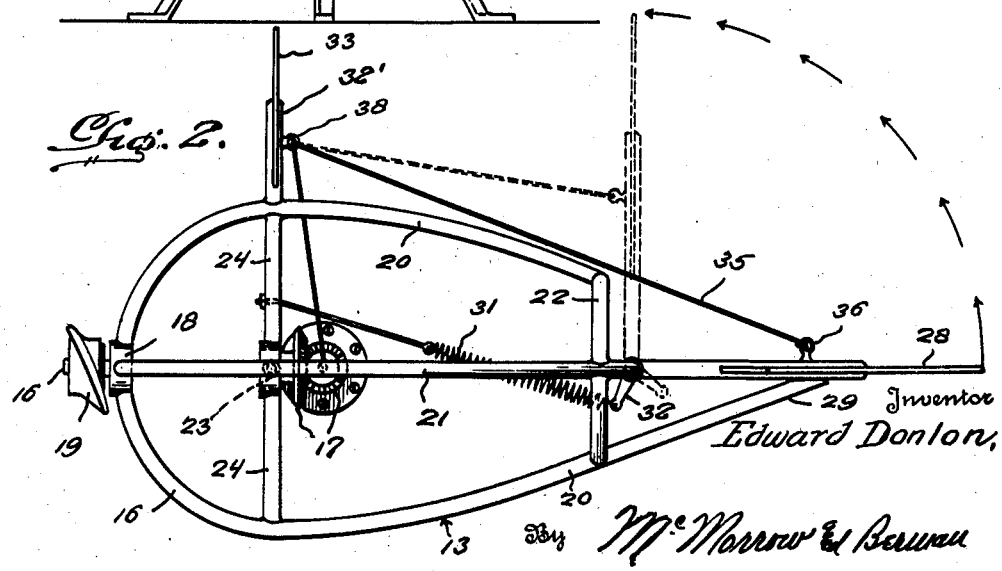
Figure 2 is a top plan view illustrating the device.
Figure 3:
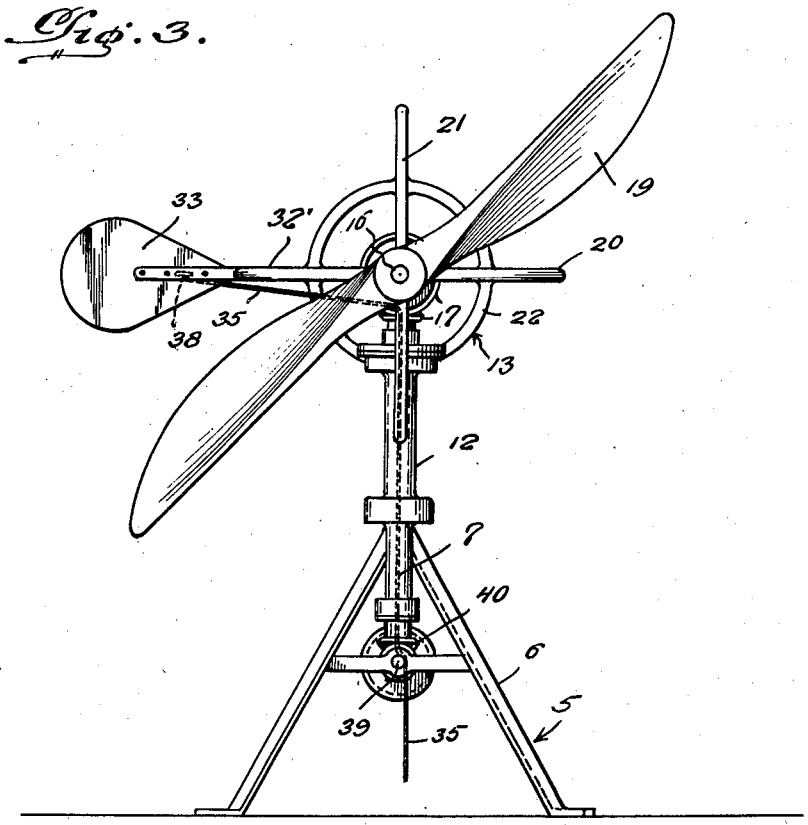
Figure 3 is an end elevation illustrating the device.
Figure 4:
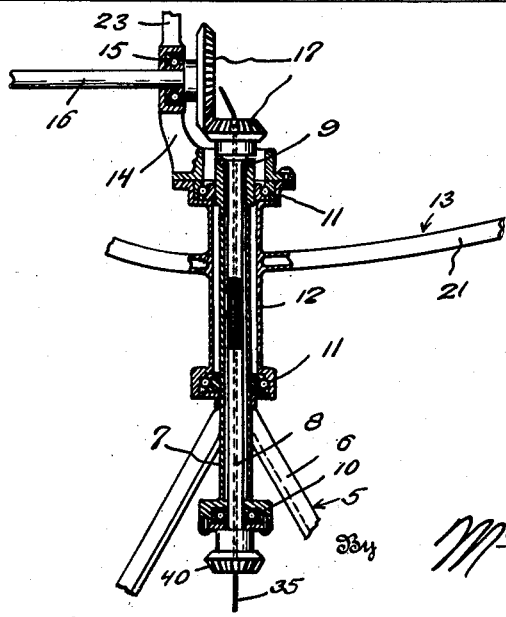
Figure 4 is a fragmentary vertical sectional view illustrating a portion of the drive mechanism.

The tail vane 28 may be swung into the dotted line position in Figure 2 for also moving the wind wheel out of the wind for stopping the operation of the device by a pull on an operating cable 35. One end of the cable is connected to an eye 36 carried by the tail vane and passing through an eye 38 on the arm 32' and then downwardly through the hollow drive shaft 8, as clearly shown in Figure 4 to be reached by the operator standing upon the ground.

The lower end of the shaft 8 is geared to a shaft 39 by gears 40. The shaft 39 is suitably journaled on the tower construction 5 and may have different size pulley wheels 41 adapted thereto. The pulley wheel 41 is belted to a generator of a conventional construction mounted on the tower construction. The generator is the source of electrical energy for an electric system.

The foregoing described construction of windcharger may be economically manufactured and will be extremely durable with the drive mechanism involved therein operating with a minimum amount of friction. Further, it will be seen that the construction of this device will permit the operation of a generator or like device by a wind of a low velocity.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a light weight rigid head construction for windmills, a wind wheel shaft bearing, horizontally and vertically arranged substantially tear-drop shaped members connected by said bearing and one of said members having an end portion of a greater length than any of the other end portions of said members to form a vane stop arm, a vertically arranged member connecting the ends of the vertically arranged substantially tear-drop shaped members providing a journal post for a spring influenced vane engageable with the stop arm for limiting its pivotal movement in one direction, a spring influenced vane including a post rotatably received by the journal, a second wind wheel shaft bearing arranged in horizontal alignment with the first bearing, and a series of radially arranged arms connecting the second bearing to said substantially tear-drop shaped members to support the second bearing in alignment with the first bearing and for tying the substantially tear-drop shaped members together.

2. In a light weight rigid head construction for windmills, a wind wheel shaft bearing, horizontally and vertically arranged substantially tear-drop shaped members connected by said bearing and one of said members having an end portion of a greater length than any of the other end portions of said members to form a vane stop arm, a vertically arranged member connecting the ends of the vertically arranged substantially tear-drop shaped members providing a journal post for a spring influenced vane engageable with the stop arm for limiting its pivotal movement in one direction, a spring influenced vane including a post rotatably received by the journal, a second wind wheel shaft bearing arranged in horizontal alignment with the first bearing, a series of radially arranged arms connecting the second bearing to said substantially tear-drop shaped members to support the second bearing in alignment with the first bearing and for tying the substantially tear-drop shaped members together, and a series of arcuately curved members for tying the substantially tear-drop shaped members together adjacent the ends thereof.

EDWARD DONLON.